United States Patent
Arata

(10) Patent No.: US 7,887,298 B2
(45) Date of Patent: Feb. 15, 2011

(54) VERTICALLY STAGGERED HELICOPTER ROTOR BLADE ASSEMBLY

(75) Inventor: Allen A. Arata, Los Angeles, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 948 days.

(21) Appl. No.: 11/165,655

(22) Filed: Jun. 24, 2005

(65) Prior Publication Data

US 2006/0292009 A1    Dec. 28, 2006

(51) Int. Cl.
*B64C 27/10* (2006.01)
*B64C 27/04* (2006.01)

(52) U.S. Cl. .................... 416/198 R; 416/124

(58) Field of Classification Search ........... 416/120, 416/124, 198 R, 201 R, 201 A, 230, 196 R
See application file for complete search history.

(56) References Cited

U.S. PATENT DOCUMENTS

| 2,414,435 A | 1/1947 | Bendix |
| 2,466,821 A | 4/1949 | Owen |
| 2,991,962 A | 7/1961 | Paikert |
| 3,065,933 A | 11/1962 | Williams |
| 3,558,081 A | 1/1971 | Williams |
| 3,592,559 A | 7/1971 | Ward |
| 3,902,821 A * | 9/1975 | Robinson ............ 416/132 R |

FOREIGN PATENT DOCUMENTS

DE            4040411 A1 *   5/1991

* cited by examiner

*Primary Examiner*—Edward Look
*Assistant Examiner*—Dwayne J White
(74) *Attorney, Agent, or Firm*—Alan G. Towner, Esq.; Pietragallo Gordon Alfano Bosick & Raspanti, LLP

(57) ABSTRACT

A helicopter rotor assembly with vertically staggered blades is disclosed. Each blade travels in a rotational path which does not cross the rotational paths of the other blades. This arrangement reduces noise because each blade travels in a path which avoids turbulent or disturbed air from the preceding blades. In one embodiment, the blades are arranged from the lowermost blade to the uppermost blade such that each blade following the lowermost blade will be above the blade in front of it. Since each blade pushes air down to create lift, this vertically staggered arrangement allows the blades to travel through less disturbed air.

7 Claims, 1 Drawing Sheet

VERTICALLY STAGGERED HELICOPTER ROTOR BLADE ASSEMBLY

FIELD OF THE INVENTION

The present invention relates to helicopter rotors, and more particularly relates to rotors having vertically staggered blades.

BACKGROUND INFORMATION

Conventional helicopters have main rotors which generate significant amounts of noise during operation. Rotation of the blades creates an unsteady aerodynamic environment which causes noise and vibration, particularly as each rotor blade interacts with the air from the previous rotor blade.

Although attempts have been made to reduce helicopter rotor noise by adjusting the shapes of the individual blades, a need still exists for rotors which generate less noise.

SUMMARY OF THE INVENTION

The present invention provides a helicopter rotor assembly with vertically staggered blades. Each blade travels in a rotational path which does not cross or overlap the rotational paths of the other blades. In one embodiment, the blades are arranged from the lowermost blade to the uppermost blade such that each blade following the lowermost blade will be above the blade in front of it. Since each blade pushes air down to create lift, this arrangement allows each blade to see less disturbed air.

An object of the present invention is to provide a helicopter rotor assembly comprising multiple blades located at vertically staggered positions with respect to each other, wherein each blade has a rotational path which does not cross the rotational paths of the other blades.

This and other objects of the present invention will be more apparent from the following description.

DETAILED DESCRIPTION

Figure 1:
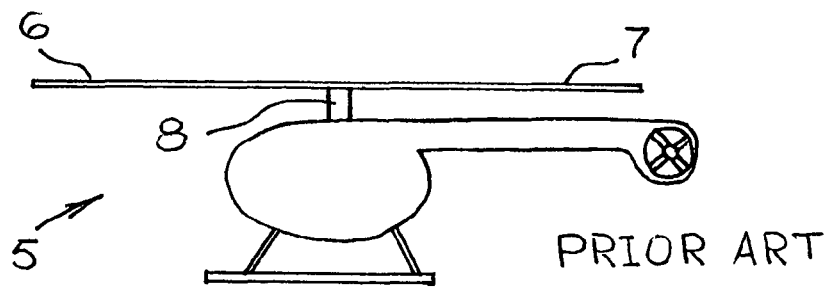
FIG. 1 is a partially schematic side view of a conventional helicopter having main rotor blades which are located at the same vertical position and which travel through each other's wakes during rotation.

FIG. 1 illustrates a conventional helicopter 5 having multiple blades 6 and 7 attached to a rotor shaft 8 at the same vertical level. This arrangement causes the blades 6 and 7 to travel in the same rotational path, such that each blade interacts with the disturbed air of the previous blade. This interaction generates noise and vibration.

Figure 2:
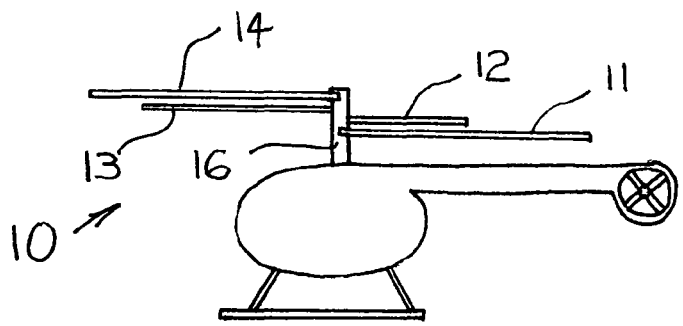
FIG. 2 is a partially schematic side view of a helicopter having vertically staggered main rotor blades in accordance with an embodiment of the present invention.
Figure 3:
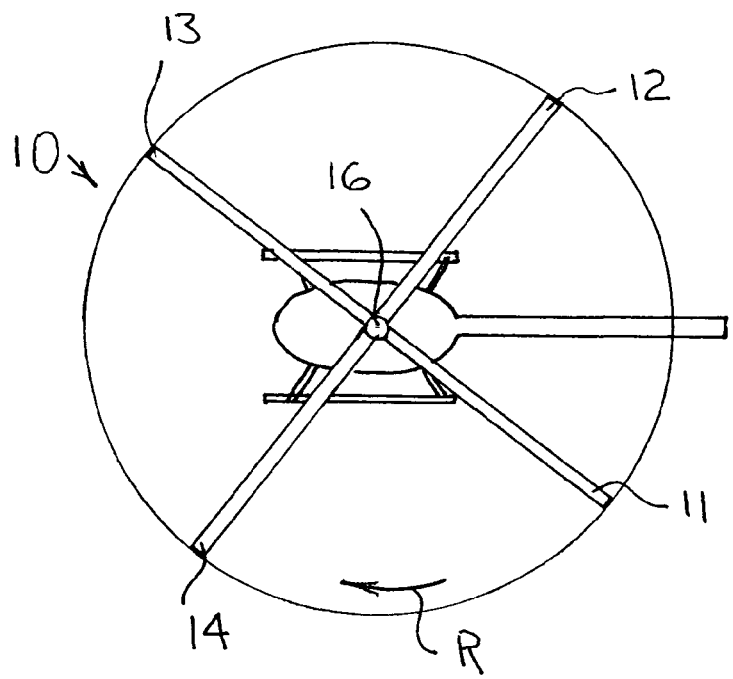
FIG. 3 is a top view of the helicopter of FIG. 2.

FIGS. 2 and 3 illustrate a helicopter 10 in accordance with an embodiment of the present invention. The helicopter 10 may be of any conventional design, except it includes a main rotor blade assembly having vertically staggered blades 11, 12, 13 and 14 attached to a rotor shaft 16. As shown most clearly in FIG. 2, each blade 11, 12, 13 and 14 is located at a different height on the rotor shaft 16, such that the rotational path of each blade does not cross or overlap the rotational path of the other blades. Each blade 11, 12, 13 and 14 extends substantially straight from the rotor shaft 16 in a substantially horizontal direction. With this configuration, each blade 11, 12, 13 and 14 rotates in a substantially flat horizontal plane, with each of the horizontal planes being at a different vertical height.

In the embodiment shown in FIGS. 2 and 3, the blades 11, 12, 13 and 14 are vertically staggered in series such that the lowermost blade 11 rotates in front of the next lowest blade 12 as the blades rotate in the direction R. The blade 13 follows and is vertically above the blade 12. The uppermost blade 14 follows and is vertically above the blade 13. This configuration reduces the amount of disturbed air the blades contact because each of the blades 12, 13 and 14 travel above the disturbed air of the preceding blade. In order to create lift, each blade pushes air downward. By rotating above the turbulent and downwardly directed air of the preceding blade, each blade 12, 13 and 14 generates less noise and vibration. Although the lowermost blade 11 may travel through the downwardly directed air of the preceding blade 14, it has a relatively large vertical offset from the preceding blade 14, and experiences less air disturbance than if the blades 11 and 14 were traveling in the same rotational path.

Although four blades 11, 12, 13 and 14 are illustrated in the embodiment shown in FIGS. 2 and 3, any other suitable number of blades may be used in accordance with the present invention. Also, although the blades are arranged at equal angular positions 90° apart in FIG. 3, other positions are possible.

Whereas particular embodiments of this invention have been described above for purposes of illustration, it will be evident to those skilled in the art that numerous variations of the details of the present invention may be made without departing from the invention as defined in the appended claims.

The invention claimed is:

1. A helicopter rotor assembly comprising at least three blades located at vertically staggered positions from a lowermost blade to an uppermost blade and at different rotational positions with respect to each other, wherein each blade has a rotational path and pushes air down as it travels in its rotational path to create lift, the rotational path of each blade is vertically separated from and does not cross the rotational paths of the other blades, and each blade following the lowermost blade travels in a rotational path located vertically above and rotationally behind the blade immediately below it.

2. The helicopter rotor assembly of claim 1, wherein each blade extends in a substantially straight direction from a rotor shaft to which the blades are attached.

3. The helicopter rotor assembly of claim 2, wherein each blade extends in a substantially horizontal direction from the rotor shaft.

4. The helicopter rotor assembly of claim 1, wherein each blade travels in a rotational path defining a substantially flat plane.

5. The helicopter rotor assembly of claim 4, wherein each plane is substantially horizontal.

6. The helicopter rotor assembly of claim 1, wherein the assembly comprises four of the blades.

7. The helicopter rotor assembly of claim 1, wherein the blades are located at substantially equal angular positions with respect to each other.

* * * * *